United States Patent [19]

Edelmann

[11] Patent Number: 4,509,465
[45] Date of Patent: Apr. 9, 1985

[54] THERMOSTAT HOUSING ASSEMBLY

[76] Inventor: Karl R. Edelmann, 1468 Chestnut La., Rochester, Mich. 48063

[21] Appl. No.: 547,003

[22] Filed: Oct. 31, 1983

Related U.S. Application Data

[63] Continuation-in-part of Ser. No. 404,463, Aug. 2, 1982, Pat. No. 4,434,750.

[51] Int. Cl.[3] .............................................. F01P 7/16
[52] U.S. Cl. ............................. 123/41.02; 123/41.1; 236/34.5
[58] Field of Search ............... 123/41.01, 41.02, 41.08, 123/41.09, 41.1, 41.2; 236/34, 34.5, 101 R, 101 C

[56] References Cited

U.S. PATENT DOCUMENTS

| | | |
|---|---|---|
| 1,355,250 | 10/1920 | O'Donnell . |
| 1,731,214 | 10/1929 | Eshbough . |
| 1,811,366 | 6/1931 | Palm . |
| 2,168,999 | 8/1939 | MacDonald . |
| 2,622,572 | 12/1952 | Nallinger . |
| 2,735,619 | 2/1956 | Schutt et al. . |
| 4,300,718 | 11/1981 | Beyer . |

FOREIGN PATENT DOCUMENTS 2653610  6/1977  Fed. Rep. of Germany ..... 236/34.5

Primary Examiner—William A. Cuchlinski, Jr.
Attorney, Agent, or Firm—Harness, Dickey & Pierce

[57] ABSTRACT

A thermostat housing assembly including a base member having a hollow tubular portion with a longitudinal axis and a first end opening disposed substantially on the axis and a second end opening offset from the axis at a predetermined angle, and an intermediate member including a cylindrical body portion and a first end portion in mating engagement with and connected to the second opening so that the intermediate member is disposed at the predetermined angle in relation to the longitudinal axis of the base member. Said intermediate member further includes a second end portion. A top stack member includes a hollow cylindrical portion having a port therethrough between the ends thereof and a cylindrical extension secured about the port. The top stack member further includes a first tapered end portion seated within and connected to the second end portion of the intermediate member so that the cylindrical end portion extends from the top stack member at a second predetermined angle in relation to the axis of the base member.

The instant invention further provides a method of manufacturing the thermostat housing including the steps of seating the first end portion of the intermediate member within the second opening of the base member to dispose the intermediate member at a predetermined angle relative to the longitudinal axis of the base member and seating the tapered end portion of the top stack member within the second end portion of the intermediate member to dispose the cylindrical extension of the top stack member at a second predetermined angle in relation to the longitudinal axis of the base member and securing the members together.

28 Claims, 19 Drawing Figures

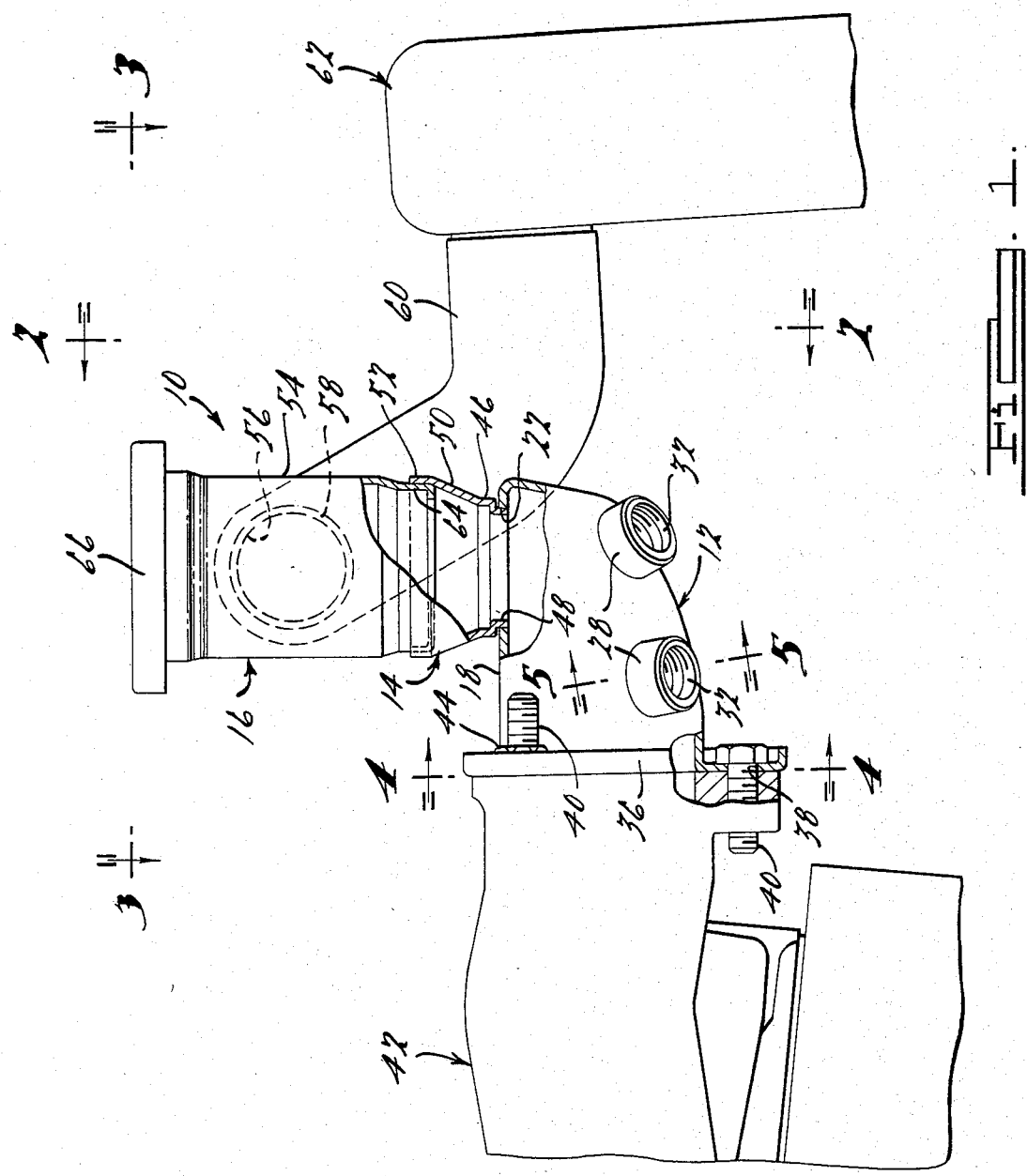

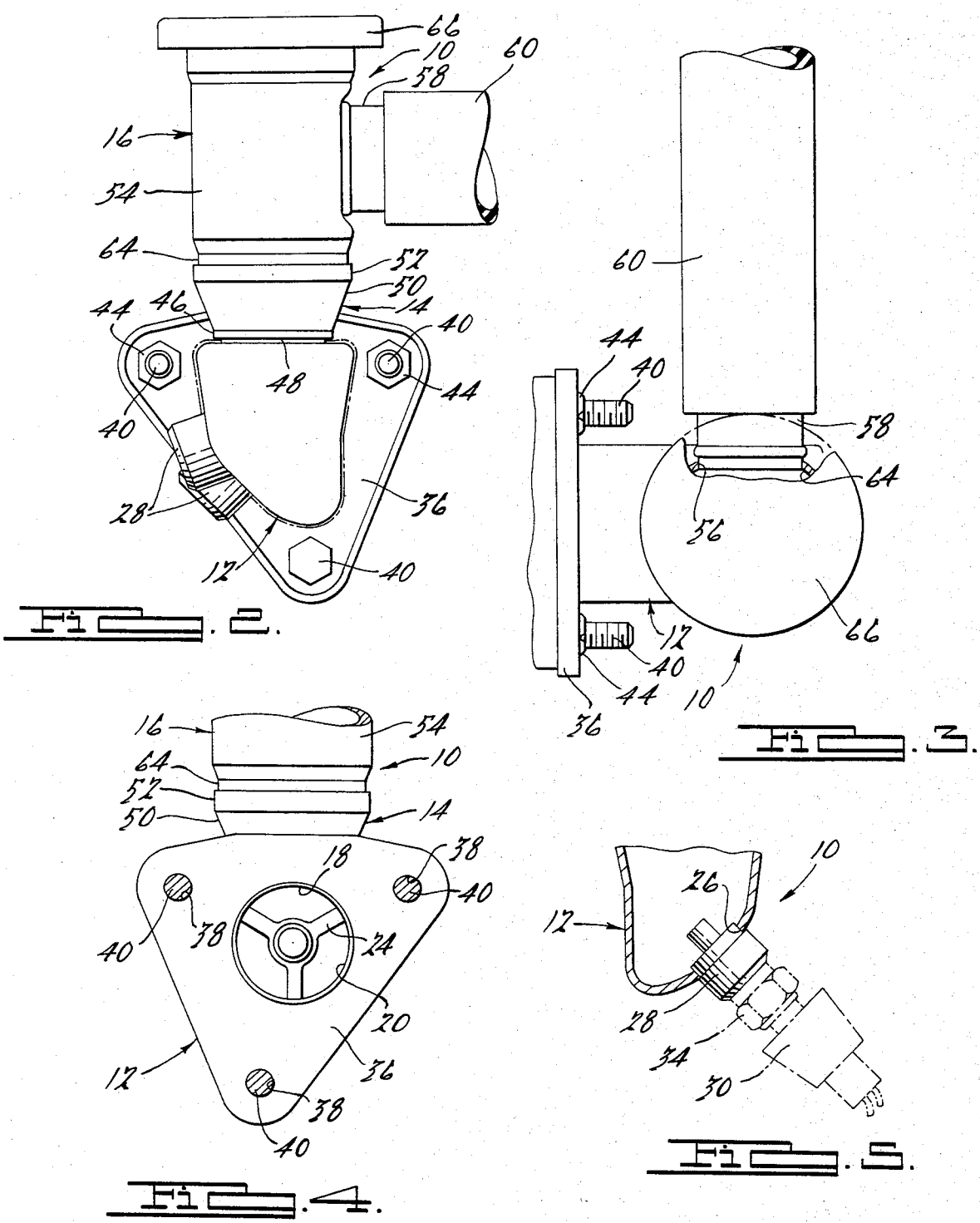

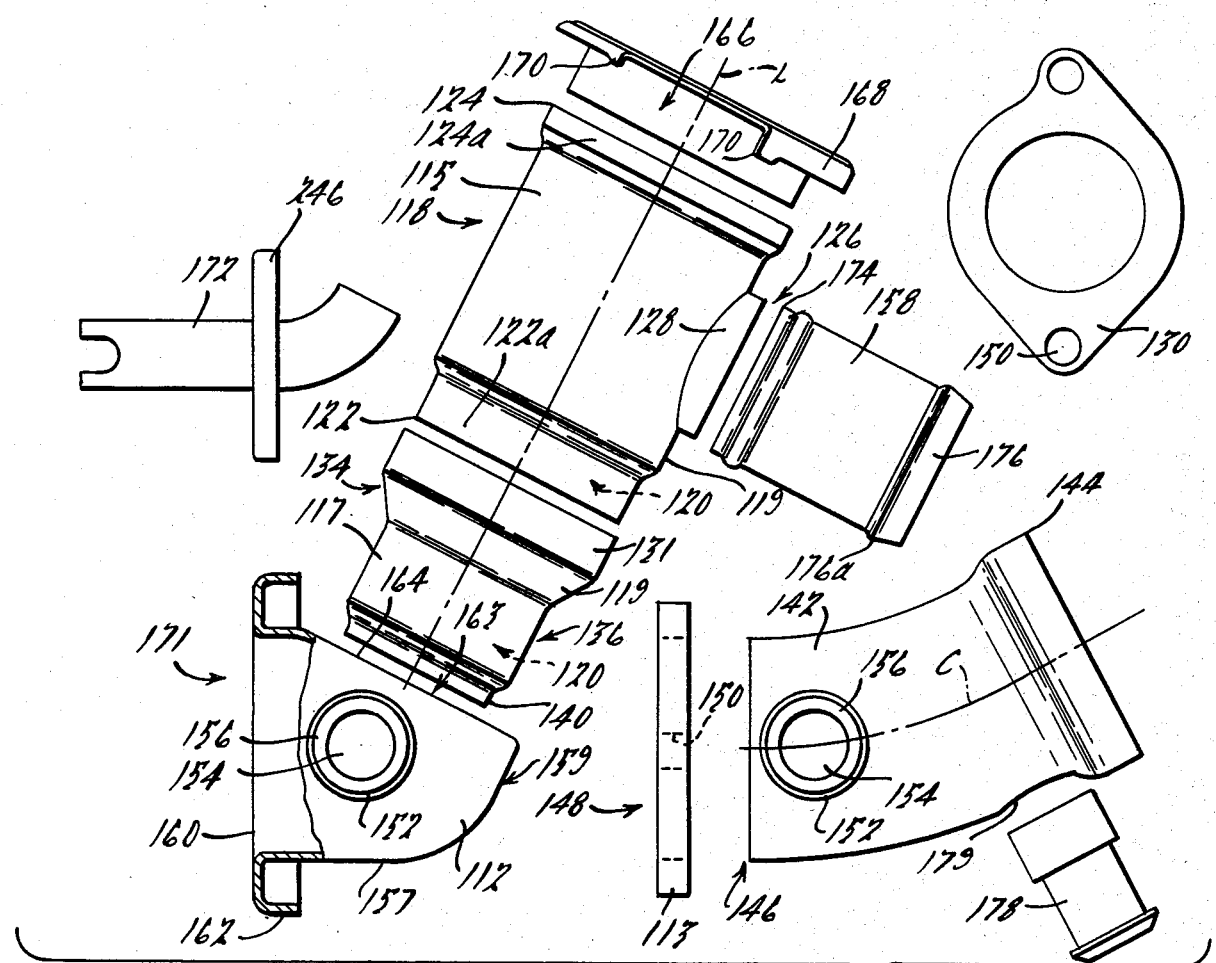
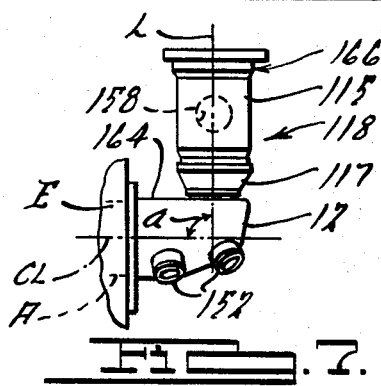
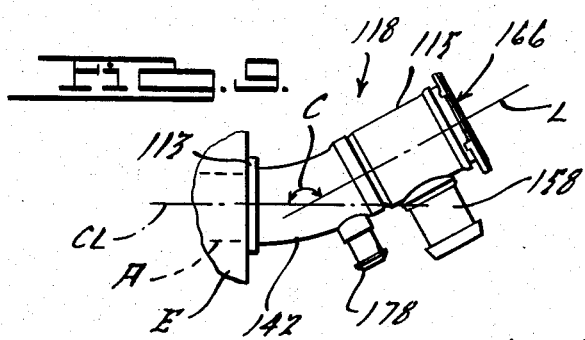
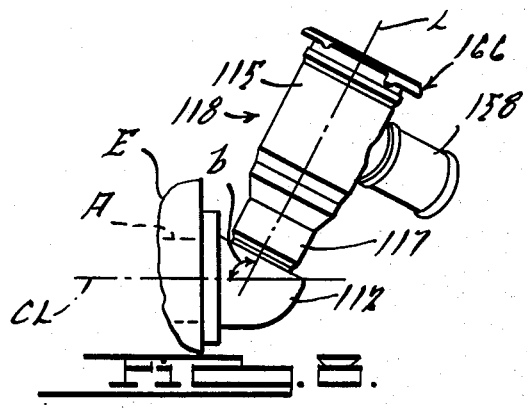
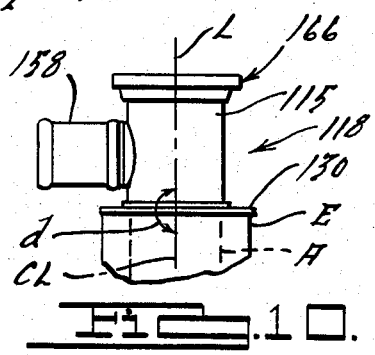

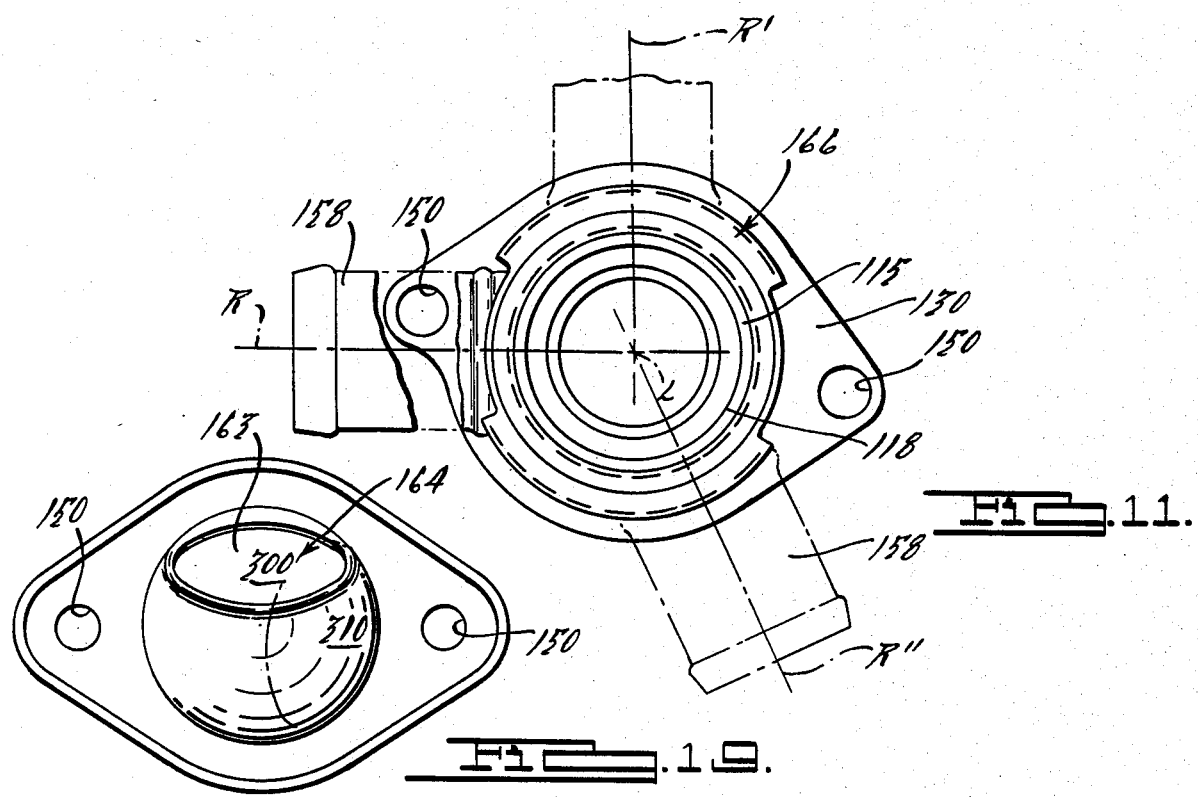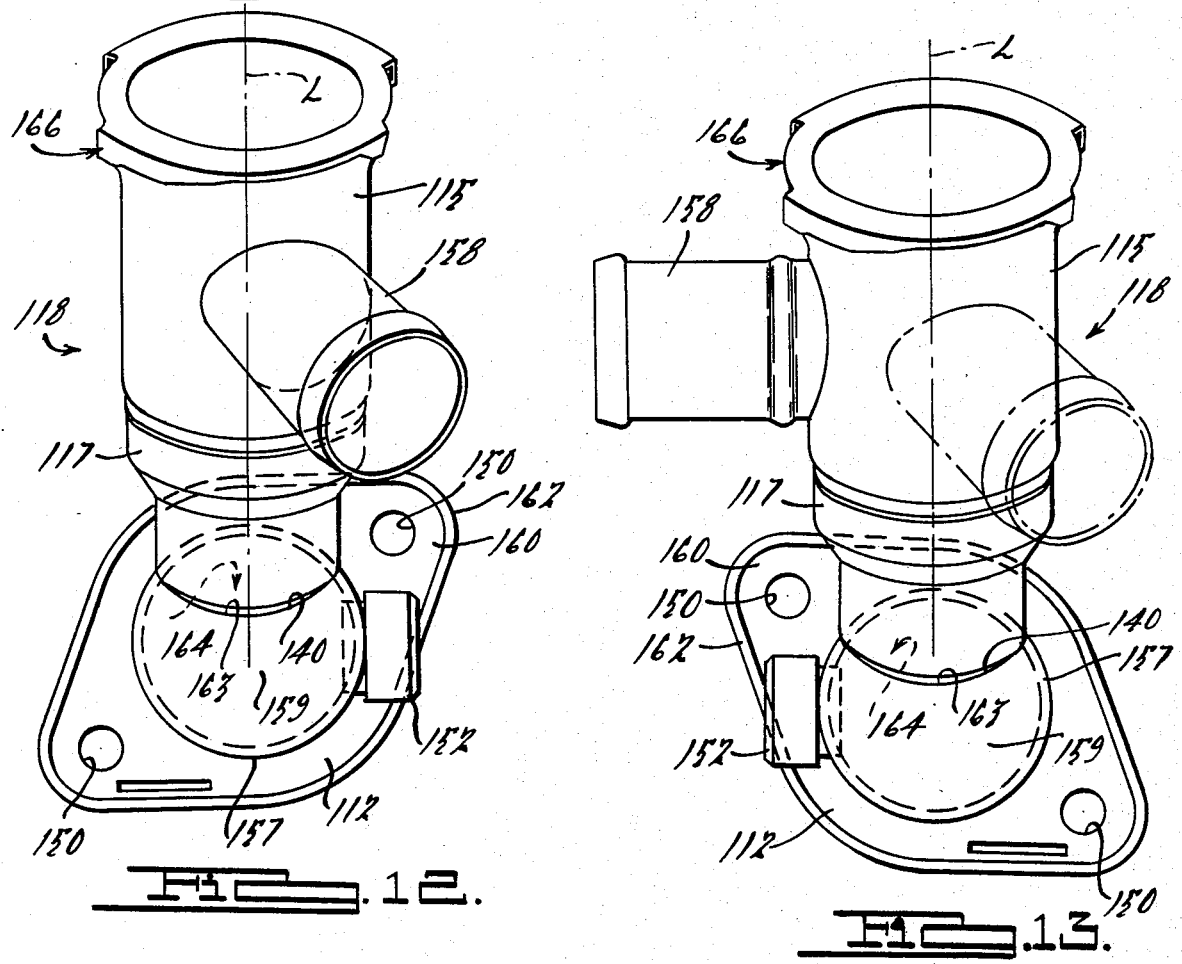

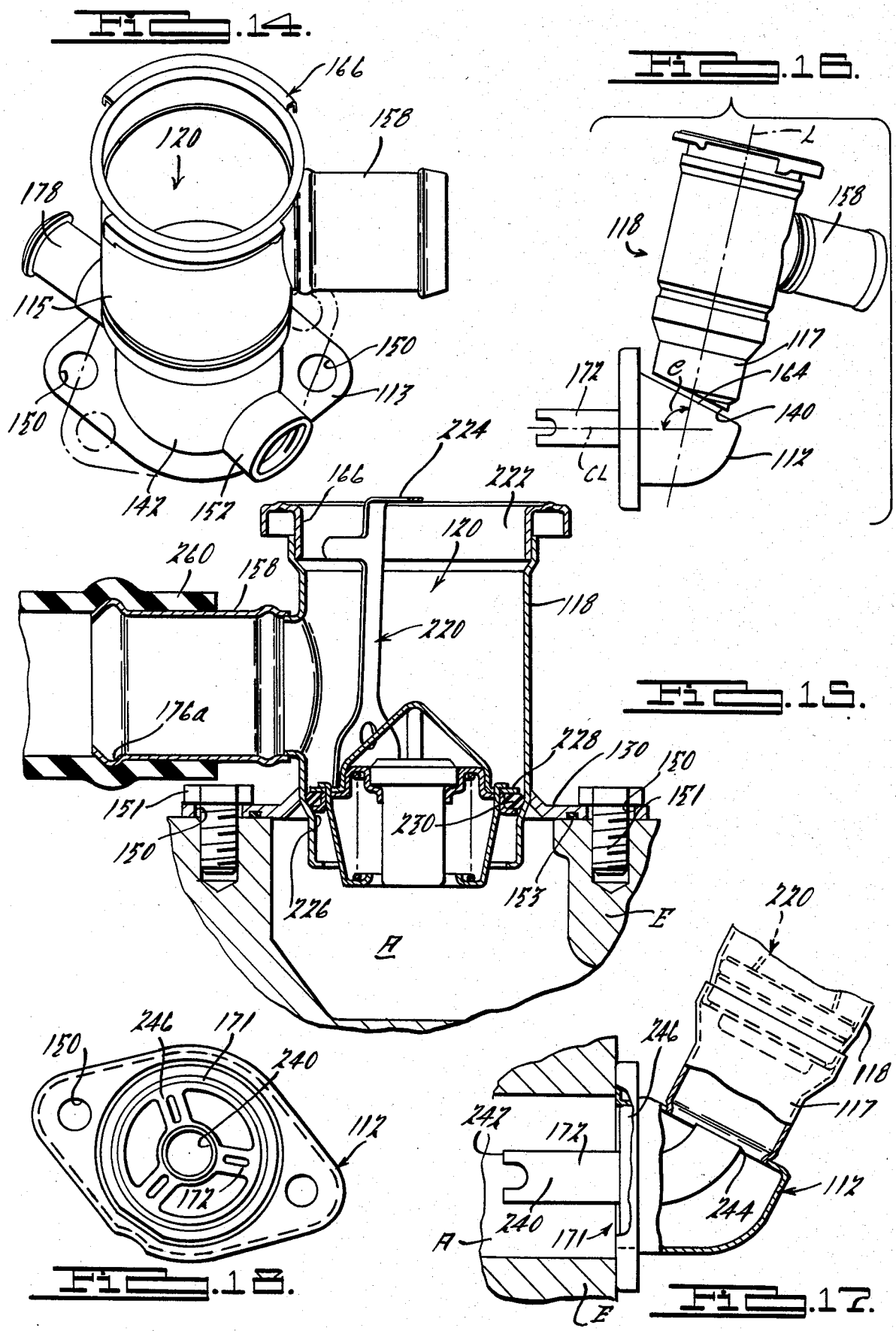

THERMOSTAT HOUSING ASSEMBLY

BACKGROUND OF THE INVENTION

1. Cross Reference To Related Application

This is a continuation-in-part of copending application Ser. No. 404,463 entitled "Thermostat Housing Assembly", filed Aug. 2, 1982 now U.S. Pat. No. 4,434,750.

2. Field of the Invention

The instant invention relates to a housing for a thermostat. More particularly, the housing may be disposed outside of a radiator housing for regulating the circulation of coolant between the radiator and an engine block.

3. Description of the Prior Art

Up until recently, thermostats were disposed within the radiator assembly of most automobiles. The thermostat controlled the flow of coolant, the path of the flow being dependent upon the temperature of the coolant. Recently, to solve car design problems, the thermostat has been located outside of the radiator assembly. Accordingly, the thermostat is disposed within a housing through which coolant is circulated. The housing shunts the fluid under the control of the thermostat. The prior art thermostat housings have been made from integral die cast aluminum castings. A problem exists with such housing structures in that the casted housings are totally inflexible and not adaptable to various engine designs. The result is that it is necessary to provide specific castings of the entire housings for specific automobile and engine designs. Thus, these housings are quite expensive and inefficient for suiting a variety of automobile and engine designs.

The subject construction is an improvement over the prior art housings since it can be adapted to be used in most engine designs which require such a housing.

SUMMARY OF THE INVENTION

A thermostat housing assembly including a base member or module including a hollow tubular portion having a longitudinal axis and a first end opening disposed substantially on the axis and a second end opening offset from the axis at a predetermined angle, and an intermediate member or module including a cylindrical body portion and a first end portion in mating engagement with and connected to the second opening so that the intermediate member is disposed at the predetermined angle in relation to the longitudinal axis of the base member. The base member includes means for attaching to the engine and the intermediate member further includes a second end portion. A thermostat receiving module comprising a top stack member includes a wall which defines a hollow cylindrical portion having a port or opening therethrough between the ends thereof. A cylindrical extension module is secured to the wall about the port to communicate with the hollow interior of the thermostat receiving module. The top stack member includes a first tapered end portion seated within and connected to the second end portion of the intermediate member so that the cylindrical extension extends from the top stack member at a predetermined angle in relation to the axis of the base member.

The invention further provides a method of constructing a thermostat housing comprising the steps of forming a thermostat receiving module to have a wall defining a hollow interior which communicates with a first opening. A second opening is formed through the wall and a hollow extension module is attached to the wall to communicate with the second opening. A base module, having means for securing to the engine, is positioned on the thermostat receiving module and attached thereto.

The instant invention further provides a method of manufacturing the thermostat housing including the steps of seating the first end portion of the intermediate member within the second opening of the base member to dispose the intermediate member at the predetermined angle relative to the longitudinal axis of the base member and seating the tapered end portion of the top stack member within the second end portion of the intermediate member to dispose the cylindrical extension of the top stack member at a second predetermined angle in relation to the longitudinal axis of the base member and securing the members together.

PRIOR ART STATEMENT

The U.S. Pat. No. 1,731,214 to Eshbaugh, No. 1,811,366 to Palm, and No. 2,168,999 to MacDonald teach thermostat housing constructions made from stamped metal parts, the parts being soldered or otherwise secured together at their junctions. The U.S. Pat. No. 1,355,250 to O'Donnell teaches a thermostat housing including an angular base member, an intermediate member, and a top stack member, the top stack member having a cylindrical extension extending therefrom. None of the aforementioned patents discloses the specific combination of members comprising the thermostat housing of the instant invention whereby the instant invention may be adapted to a variety of engine designs. Furthermore, none of the aforementioned prior art patents discloses the specific method of manufacturing the subject thermostat housing whereby a single housing may be adapted to various configurations and locations of the engine block in relation to the radiator assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an elevational partially broken-away view of the subject thermostat housing in fluid communication with an engine block and a radiator assembly;

FIG. 2 is an elevational view taken substantially along line 2—2 of FIG. 1;

FIG. 3 is a plan view taken substantially along line 3—3 of FIG. 1;

FIG. 4 is a fragmentary cross sectional view taken substantially along line 4—4 of FIG. 1;

FIG. 5 is a fragmentary cross sectional view taken substantially along line 5—5 of FIG. 1;

FIG. 6 illustrates a family of components or modules usable in practicing the invention;

FIG. 7 is a diagramatic view of thermostat housing in accordance with the invention, showing a first spatial orientation of mounting base and thermostat receiving module;

FIG. 8 is a similar diagramatic view, showing a second spatial orientation of mounting base and thermostat receiving module;

FIG. 9 is a similar diagramatic view showing a third spatial orientation of mounting base and thermostat receiving module;

FIG. 10 is a similar diagramatic view showing a fourth spatial orientation of mounting base and thermostat receiving module;

FIG. 11 is a top view of the thermostat receiving module and extension module, showing the extension module in various different radial positions with respect to the longitudinal axis of the thermostat receiving module;

FIG. 12 is a perspective view of one embodiment of the invention, showing the mounting base module in a first spatial orientation with respect to the thermostat receiving module and extension module;

FIG. 13 is a similar perspective view of an embodiment of the invention showing the mounting base in a second spatial orientation with respect to the thermostat receiving module and extension module;

FIG. 14 is a perspective view of another embodiment of the invention, showing the mounting base module in yet a third spatial orientation with respect to the thermostat receiving module;

FIG. 15 is a cross sectional view of the thermostat housing embodiment of FIG. 10, showing the placement of thermostat within the thermostat receiving module;

FIG. 16 is a side view of a thermostat housing in accordance with the invention, illustrating an alternative means for achieving a predetermined spatial relationship between base module and thermostat receiving module;

FIG. 17 is a detailed partial cross sectional view showing the fluid directing spout module of the invention; and FIG. 18 is an end view of the fluid directing spout of FIG. 17 assembled on the base module; and, FIG. 19 is a diagramatical view of a base module illustrating the flattened surface at various selected locations.

DESCRIPTION OF THE PREFERRED EMBODIMENT

In contrast with prior art thermostat housings which, have been made as integral die cast parts, the present invention provides a family of components or modules which may be assembled to form the thermostat housing. A representative family of modules is shown in FIG. 6. It will be understood that the family of modules of FIG. 6 does not exhaust all possible module configurations, but is merely representative of the class of modules usable to practice the invention. For example, the lengths of the modules, and their spatial orientations, once assembled, may be changed to implement a wide variety of thermostat housing assemblies.

With reference to FIG. 6, stack module 115 and intermediate coupling module 117 are illustrated. Stack module 115 comprises the principal thermostat receiving module 118 of the invention. In some embodiments stack module 115 alone defines the thermostat receiving module 118, while in other embodiments the stack module 115 is combined with other modules, such as intermediate coupling module 117 to define the thermostat receiving module 118. Thus, it will be understood that the thermostat receiving module may, for example, comprise stack module 115 alone, or stack module 115 in combination with intermediate coupling module 117. Both the stack module 115 and intermediate coupling module 117 are preferably stamped from sheet metal and formed to have sidewalls 119 disposed about a longitudinal axis L to define generally cylindrical hollow interiors 120. Stack member 115 is open at its respective ends 122 and 124, and includes an opening 126 in the sidewall 119 thereof. Opening 126 includes a flaired annular portion 128 for interfitting connection with an extension module 158 yet to be described. End 122 of stack module 115 has a reduced diameter rim 122a adapted for interfitting engagement with end 131 of intermediate coupling member 117. End 124 is formed with an outwardly expanded or increased diameter rim 124a for interfitted coupling with cap receiving module or member 166. Cap receiving member 166 is fashioned with a radially flanged annulus 168 having toothed portions 170 for twist-locking engagement with a cap member (not shown). The cap member is of the conventional radiator cap type.

Intermediate coupling module 117 is preferably formed by stamping from sheet metal to have a frusto-conical first end portion 134 and a reduced diameter, cylindrical second end portion 136. First end portion 134 is adapted to receive rim 122a while second portion 136 includes a further reduced diameter rim 140 for interfitting engagement with one of a variety of base modules, such as base module 112 yet to be discussed.

An alternative intermediate coupling module 142 is also shown in FIG. 6. Coupling module 142 comprises a generally hollow bent or curved cylindrical member, disposed about a curved longitudinal axis C. Intermediate coupling module 142 includes an increased diameter rim or end 144 for interfitting engagement with the reduced diameter rim 122a of stack member 115. The opposite end 146 of member 142 is adapted for interfitting engagement with a base member such as base member 113. Base member 113 comprises a substantially flat plate having a central opening 148 for interfitting engagement with end 146 and also having means for securing to the engine, such as bolt receiving holes 150. Base member 113 is also shown in FIG. 14.

In accordance with the present practice of providing one or more takeoff points for connecting electrical temperature sensors for computer controlled engine functions, one or more of the modules may be furnished with sensor mounting fittings 152. The electric thermosensors are used, for example, to activate anti-pollution systems, exhaust gas recirculation systems, emission controls and the like. Fittings 152 are shown on base module 112 and intermediate connecting module 142 of FIG. 6; although it will be understood that such fittings might be formed on other modules as well, or formed on the modules shown but at different locations. A thermostat housing with two fittings 152 is shown in FIG. 7. (See also FIGS. 1 and 2 where the fittings are indicated by the reference numeral 28). Fittings 152 generally comprise a central bore 154 with internally threaded neck 156 disposed thereabout. The threaded internal surface of neck 156 is adapted to retain the electrical sensor.

Extension module 158, which comprises a generally hollow cylinder, has a first end 174 for interfitting engagement with flaired portion 128 about opening 126. Extension module 158 provides the primary coupling for receiving a flexible radiator hose. To help hold a radiator hose in place module 158 has a ribbed second end 176 having annular rib 176a thereabout. Additional flexible hose connections, if required, are also made possible by the provision of supplemental extension modules, such as module 178. Module 178, comprising a generally hollow cylinder or tube, may be assembled within opening 179 through the sidewall of base module 142, for example.

In accordance with the present invention, several different base module configurations are provided, for wide flexibility in assembing thermostat housings to meet the needs of the automotive industry. Exemplary configurations are illustrated and described herein, including base module 12 (shown in FIGS. 1–5 and 7 and described more fully below); base module 112 (shown in FIGS. 6, 8, 12, 13 and 16–19); and base module 130 (shown in FIGS. 6, 10, 11 and 15). Also coupling module 142, equipped with base member 113, serves as a base module (as shown in FIGS. 6, 9 and 14). Base module 112 is stamped from sheet metal to include a generally hollow cylindrical body portion 157 having a generally hemispherical closed end 159 and a radially extending, flanged mounting portion 160 integrally formed about the open end 171. Mounting portion 160 includes downturned edges 162 to strengthen the mounting portion. Body portion 157 is flattened as at surface 164, and includes opening 163 through surface 164 which is sized to interfit with rim 140 of intermediate coupling module 117 or the like. The cylindrical body portion 157 and hemispherical closed end 159 are quite advantageous in that they may be flattened at virtuallly any surface location, thereby allowing the flanged mounting portion 160 to be spatially oriented in practically any given direction. Open end 171 is generally centrally located within mounting portion 160 for communication with a coolant transmitting aperture on the engine block once the thermostat housing of the invention is bolted in place. Opening 171 is adapted to receive optional flow directing spout module 172 (and webbed insert member 246) as will be discussed more fully below.

FIGS. 7, 8, 9 and 10 illustrate four different thermostat housing embodiments which may be assembled using selected modules described above. FIG. 7 utilizes base module 12, intermediate connecting module 117, stack module 115, and cap receiving module 166, as well as extension module 158. As shown, the thermostat receiving module 118 (comprising modules 115 and 117) is disposed about a longitudinal axis L. The longitudinal axis L defines an angle "a" with centerline CL which runs perpendicularly through the coolant transmitting aperture A of engine block E.

For comparison purposes, FIG. 8 illustrates another embodiment of thermostat housing which may be assembled using base module 112, intermediate coupling module 117, stack module 115, cap receiving module 166, and extension module 158. As shown, the thermostat receiving module 118 (comprising modules 115 and 117) is disposed about longitudinal axis L which forms angle "b" with centerline CL of the coolant transmitting aperture A of engine block E.

Still another embodiment is illustrated in FIG. 9, which is assembled using base member 113, coupling module 142, stack module 115, cap receiving module 166, and extension module 158. In this embodiment the longitudinal axis L of the thermostat receiving module 118 (comprised of modules 115 and 142) forms angle "c" with centerline CL of the coolant transmitting aperture A of engine block E.

In yet another embodiment illustrated in FIG. 10, the thermostat housing is assembled using a flat plate base module, such as base module 130 or similar thereto. The thermostat housing embodiment further includes stack module 115 with cap receiving module 166 and extension module 158. The thermostat receiving module 118, (comprised solely of stack module 115), is disposed about longitudinal axis L which is coincident or coextensive with centerline CL of the coolant transmitting aperture A of engine block E. Thus, in this instance, the angle "d" between L and CL is 180°.

By comparing the angles "a", "b", "c" and "d" it will be seen that practically any spatial oreintation can be attained by the judicious selection of modules. In this regard it will be understood that the base module is intended to mount to the engine block over a coolant transmitting aperture. In FIGS. 7 through 10 the engine block is designated generally by reference character E and the coolant transmitting aperture A lies in a plane perpendicular to is centerline CL. The ability to spatially orient the base module with respect to the remainder of the the thermostat housing adds to the invention's adaptability to different engine-radiator systems.

During assembly of the thermostat housing, the modules are first interfitted or assembled on one another, oriented to the proper spatial relationship, and then brazed or soldered together. The construction method affords great flexibility in the positioning of various modules in spatial relationship to one another. For example, as illustrated in FIG. 11, the extension module 158 may be positioned along any radial R about longitudinal axis L of thermostat receiving member 118 by simply rotating member 118 with respect to the base module prior to brazing or soldering it in place. FIG. 11 illustrates three such possible extension module locations along radii R, R' and R''. If an intermediate coupling module 117 is utilized, the proper spatial positioning of extension module 158 may also be accomplished by first brazing coupling module 117 to the base module, such as base module 112, and then rotating stack module 115 on module 117 about longitudinal axis L until the desired spatial arrangement is reached. The above-described construction permits the manufacturer to locate extension module 158 along any selected radial about the longitudinal axis L. In other words, prior to brazing or soldering, the modules provide the manufacturer with at least one degree of freedom to rotationally position the extension module 158 relative to the base module, and ultimately relative to the engine block. Thus the relative spatial relationship of the engine block and its associated radiator can be taken into account during the assembly of the thermostat housing prior to brazing or soldering the modules in place. To simplify the illustration in FIG. 11, a simple flat plate base module 130 has been illustrated. However, the same degree of rotational freedom is provided regardless of which base module is utilized.

Even further control over the spatial relationships of the various modular components is provided by the way the base module is constructed and assembled with the thermostat receiving module and other modules. To illustrate, FIGS. 12 and 13 show base module 112 in two different spatial orientations. It will be recalled that base module 112 comprises flanged mounting portion 160 with downturned edges 162 to increase its strength. The flanged portion is integrally formed or stamped with the intermediate cylindrical body portion 157 and hemispherical closed end 159. The flanged mounting portion includes means for securing to the engine in the form of holes 150 for receiving mounting bolts or equivalent fasteners. By comparison of FIGS. 12 and 13 it will be seen that, taking axis L to be the 12 o'clock position, the mounting holes 150 of FIG. 12 lie at the two o'clock and eight o'clock positions, whereas in FIG. 13 they lie at the four o'clock and ten o'clock positions. The mounting hole placement is determined during manufacture by judiciously selecting which portion of the cylindrical body portion 157 and hemispherical closed end 159 should be flattened to form surface 164. (It will be recalled that flattened surface 164 is provided with an opening 163 into which rim 140 of intermediate coupling member 117 is assembled.) In general, the body portion 157 and end 159 may be flattened to receive a thermostat receiving member at the intersection of any of a number of lines of latitude and longitude on the surface portion 157 and/or end 159, thereby providing at least two degrees of freedom in the location of the thermostat receiving module prior to brazing or soldering. With reference to FIG. 19, taking the line between holes 150 to define the equitorial of body portion 157, one selected location for flattened surface 164 is shown in the northern hemisphere, as at 300, while another selected location is shown in dashed lines in the eastern hemisphere, as at 310. Similarly, the location of sensor coupling 152 may be at any position on spherical portion 157 as desired. Two such different positions are shown in FIGS. 12 and 13.

FIG. 14 illustrates how different spatial orientations are achieved using coupling module 142. As indicated by the phantom lines, base member 113 can be rotated about module 142, prior to brazing, in order to position mounting holes 150 at the desired location. Stack module 115 may be rotated within module 142, prior to brazing, in order to position extension module 158 at the desired spatial location. In this regard, compare the location of extension module 158 relative to supplemental extension module 178 in FIG. 14 with that of FIG. 9. Furthermore, supplemental extension module 178 and/or sensor mounting fitting 152 may be positioned in practically any location by appropriately positioning opening 179 and/or bore 154. For example, compare the location in FIG. 6 of opening 179 (for receiving module 178) vis a vis fittin 152, with the different location of module 178 vis a vis fitting 152 in FIG. 14.

FIG. 16 illustrates an alternative means for achieving a predetermined spatial relationship between thermostat receiving module 118 and base module 112. In this alternative embodiment, the intermediate coupling module 117 (or thermostat receiving modulel 118) is angularly sliced along rim 140 to alter the angle "e" between longitudinal axis L and centerline axis CL once the modules are assembled. The angularly sliced end may be used in conjunction with flattened portion 164, as shown. Similarly, different spatial relationships may be achieved by angularly slicing the rim 122a of stack module 115, or by angularly slicing end 131 of intermediate coupling module 117 to alter the angle between modules 115 and 117.

Referring now to FIG. 15, thermostat receiving module 118 is shown in cross section to reveal the placement of thermostat 220. The engine is designated generally by reference character E and the coolant transmitting aperture by reference character A. The thermostat receiving module 118 is attached to base module 130 and also includes extension module 158 for coupling to a flexible radiator hose 260. Thus the thermostat housing of FIG. 15 will be recognized as the housing also shown in FIGS. 10 and 11. However, it will be understood that the placement of thermostat member 220 within the thermostat receiving module 118 is substantially the same for all of the thermostat housing configurations described herein. Base module 130 is secured to engine E as with bolts 151. Gasket 153 is used to provide a tight seal. Thermostat receiving module 118 includes across opening 222 onto which a conventional radiator cap (not shown) may be removably secured. Thermostat member 220 includes a lifting strap 224 to assist in the manual placement and removal of thermostat members into and from the housing. Thermostat receiving module 118 includes a means for receiving or carrying thermostat member 220 in the form of an annular shoulder 226 formed about the inside circumference of the sidewall. Thermostat member 220 has a disk-shaped body portion 228 with circumferential rubber o-ring 230 about the outer periphery which rests on shoulder 226 to form a fluid seal. Since thermostats are well known in the art, it is believed unnecessary to go into any further detail here. The present invention is designed to fit and accommodate all of the thermostats presently being marketed and used on automobiles today.

FIG. 17 shows the utilization of optical flow directing module 172 in conjunction with base module 112 and intermediate coupling module 117. Thermostat member 220 is partially depicted in phantom in FIG. 17. Flow directing module 172 includes an elbow shaped pipe or spout 240 which has a first end 242 adapted to project into a coolant transmitting aperture A of an engine E and has an opposite end 244 which is directed toward the underside of thermostat member 220. In this fashion, engine coolant may be aimed directly at the thermostat member, causing the thermostat member to heat up or react more quickly. Spout member 240 is held in place by means of webbed insert member 246; as shown in FIG. 18. Webbed insert member 246 has an outer periphery adapted to interfit with opening 171 in base member 112 as shown in FIG. 18.

For a more complete understanding of the invention, another exemplary embodiment at a thermostat housing assembly, constructed in accordance with the instant invention, is generally shown at 10 in FIGS. 1–5 and will be discussed in greater detail.

The assembly 10 includes basically three members made from sheet metal formed by conventional progressive dies; that is, a base member generally shown at 12, an intermediate member generally shown at 14, and a top stack member generally shown at 16.

The base member 12 includes a hollow tubular portion 18 having a longitudinal axis. The base member 12 further includes a first end opening 20, shown in FIG. 4, on the longitudinal axis defined by the tubular portion 18. The base member 12 also includes a second opening 22, as shown in FIG. 1, the second opening being offset from the longitudinal axis defined by the tubular portion 18 at a predetermined angle relative to the longitudinal axis. A webbing 24 extends across the interior of the tubular portion 18 for supporting a thermostat assembly within the thermostat housing assembly 10. The thermostat assembly would be seated upon and connected to the webbing 24. The base member 12 includes several bores 26 therethrough and neck members 28 connected about the bores 26 for supporting electrical connections 30 to the thermostat assembly 10. Each neck member 28 includes a threaded inner surface 32 adapted to retain the electrical connector 30 in mating engagement therewith. The connector 30 may include an adapter 34 secured thereto to provide a proper engagement with the neck member 28.

The base member 12 further includes a flange 36 extending radially outwardly from the first end opening 20. The flange 36 has a plurality of holes 38 therethrough for receiving connecting bolts 40, the connecting bolts 40 securing the base portion 12 to an engine assembly generally shown at 42 in FIG. 1. Nut members 44 retain the bolts 40 in place. The nut members 44 may be removed from the bolts to allow for replacement or service of the assembly 10.

The intermediate member 14 includes a body portion 46. The intermediate member 14 also includes a first end portion 48 having a recessed diameter relative to the body portion 46. The end portion 48 is in mating engagement with and connected to the second opening 22 of the base portion 12 so that the intermediate member 14 is disposed at the predetermined angle in relation to the longitudinal axis defined by the tubular portion 18 of the base member 12. In other words, the angular relationship of the intermediate member 14 to the base member 12 is dependent upon the angle of the opening 22 relative to the longitudinal axis defined by the tubular portion 18 of the base member 12. Accordingly, a base member 12 may be manufactured so as to have the opening 22 at any predetermined angle relative to the tubular portion 18, thereby positioning the intermediate member 14 at the predetermined angle relative to the base member 12.

The intermediate member 14 further includes a second frusto-conical end portion 50. An annular flange 52 may be disposed at the end of the frusto-conical end portion 50.

The top stack member 16 includes a hollow cylindrical portion 54 having a port 56 extending therethrough. A cylindrical extension or adapter member 58 is secured to the top stack member 16 about the port 56. The cylindrical extension 58 is adapted to have a hose 60 mounted thereon whereby the hose 60 has one end secured to the cylindrical extension 58 and a second end connected to a radiator assembly generally indicated at 62. The top stack member 16 further includes a first tapered end portion 64 seated within and connected to the second end portion 50 of the intermediate member 14 so that the cylindrical extension 58 extends from the top stack member 16 at a second predetermined angle in relation to the longitudinal axis defined by the tubular portion 18 of the base member 12. In other words, rotation of the top stack member 16 within the second end portion 50 of the intermediate member 14 so that the cylindrical extension 58 extends from the top stack member 16 at a second predetermined angle in relation to the longitudinal axis defined by the tubular portion 18 of the base member 12. In other words, rotation of the top stack member 16 within the second end portion 50 of the intermediate member 14 prior to securing the top stack member 16 to the intermediate member 14 positions the cylindrical extension 58 at a predetermined angle relative to the base member 12. Thus, a single housing assembly 10 can be adapted to different engine designs and positioning of radiator assemblies relative to the engine structures.

The top stack member 16 further includes a second end opening 64 and a cap member 66 removably mounted over the second end opening 64 for perfecting a seal thereabout.

The instant invention further provides a method of manufacturing thermostat housings such as the subject thermostat housing 10 and also the other embodiments shown in FIGS. 6 through 18.

The thermostat receiving module 118 is formed as by stamping from sheet metal to have a wall defining a hollow interior. The thermostat receiving module is preferably formed in the shape of a hollow cylinder open at both ends. In other words, the wall which defines the module includes an access opening at end 124 which communicates with the hollow interior, and also includes another opening at end 122, the opposite longitudinal end thereof, which communicates with the hollow interior and provides a means for attaching to other modules. The thermostat receiving module is formed with an opening such as opening 126 in the sidewall which also communicates with the hollow interior. The material about the periphery of this opening is flaired outwardly to define annular portion 128 or a means for attaching the extension module 158 thereto. If desired, in order to make thermostat receiving module 118 longer or to achieve a desired spatial configuration, module 118 may be assembled from a plurality of submodules. In accordance with the invention, module 118 may be constructed by forming separate stack module 115 and intermediate coupling module 117. The stack module 115 and intermediate coupling module 117 are each formed, as by stamping from sheet metal, to include nestable or interfitting end or rim portions, such as rim 122a and end 131. Stack module 115 and intermediate coupling module 117 are then assembled together and brazed to form a permanent union. Prior to brazing, modules 115 and 117 can be axially rotated relative to one another; shortened by slicing, grinding or machining; and/or angularly oriented by angularly slicing, grinding or machining end 131 and/or rim 122a to provide a wide variety of lengths and spatial configurations.

Next the extension module 158 is formed to have a sidewall defining a cylindrical tube or pipe having a hollow interior. A first end 174 of extension module 158 is formed with means for interfitting assembly with the flaired annular portion 128 of the thermostat receiving module 118. The opposite longitudinal end 176 of extension module 158 is formed with an annular rib 176a for retaining a radiator hose member 260. The interior of the hollow extension module thus communicates with the interior of the thermostat receiving module. After assembling the extension module 158 on the thermostat receiving module 118, the interfitted connection is brazed or soldered to form a permanent union.

The thermostat receiving module 118 is then assembled on any of the above-described base modules, e.g. base module 112, base module 130, or base module 12. Before brazing or soldering the base module to the thermostat receiving module, the thermostat receiving module may be rotationally oriented about its longitudinal axis to place the extension module 158 in any desired radial position. Preferably the radial position is selected in accordance with the predetermined or preexisting spatial relationship of the engine to the radiator.

As was explained above, a wide variety of base modules may be selected from in order to dispose the longitudinal axis of the thermostat engine mounting plate or means for securing to the engine. If it is desired to orient the thermostat receiving module in direct line with the coolant transmitting aperture of the engine, the thermostat receiving module may be assembled with a simple plate type base module 130 as illustrated in FIGS. 10 and 15. If an angular relationship between thermostat receiving module and engine mounting means is desired, the base module may be formed with a longitudinal bend as illustrated in FIG. 9. In lieu of fabricating the bent base module of FIG. 9, a tubular base module may be fabricated as shown in FIGS. 7 and 8. This tubular base module may be stamped to integrally include a flanged mounting portion 160, a generally cylindrical intermediate portion or body portion 157, and a closed end portion 159, as shown in FIGS. 7 and 8. A portion of the base module is formed with a flat mounting surface 164 through which an opening 163 is provided for communicating with the thermostat receiving module. The periphery of this opening 163 may be outwardly flanged to form a means for interfitting engagement with the thermostat receiving module. Flattened portion 164 may be formed either during the fabrication of the base module or afterwards. With reference to FIG. 7, it will be seen that the flattened portion 164 may be disposed so that thermostat receiving module 118 is longitudinally arranged to be generally perpendicular to the centerline axis CL of the coolant transmitting aperture of the engine. Of course, the flattened portion may be formed at other locations to yield different spatial orientations of thermostat receiving module 118. For example, FIG. 8 shows a thermostat receiving module which is longitudinally disposed at an obtuse angle "b" with respect to the centerline axis CL of the coolant transmitting aperture of the engine. FIG. 9 shows another obtuse angular configuration achieved using a bent module 142 in place of the flattened base module. In general, the location of flattened portion 164, or the degree to which bent module 142 is curved, is determined in accordance with the predetermined or spatial relationship between the engine or radiator.

Not only does the method of constructing thermostat housing allow the manufacturer to control or determine the angular relationship between thermostat receiving module and base module, it also permits the manufacturer to determine the orientation of base mounting holes with respect to the assembled thermostat housing. With reference to FIGS. 12 and 13 mounting holes 150 are shown at two different orientations. The location of the mounting holes may be controlled during fabrication by simply selecting which portion of the body portion 157 is to be flattened. As an example, taking the line between holes 150 as an equatorial, FIG. 12 depicts flattened portion 164 in the northeast hemisphere of body portion 157, whereas FIG. 13 depicts flattened portion 164 in the northwest hemisphere. Control over the location of mounting holes is also afforded by the embodiment of FIG. 10, simply by rotating mounting base module 130 relative to thermostat receiving module 118 prior to brazing or soldering. Similarly, the mounting holes of the FIG. 9 embodiment may be located at any desired position by rotating base plate module 113 relative to bent portion 142, as demonstrated in FIG. 14.

Although not required in all applications, the thermostat receiving module 118 may be assembled from separate modules, such as intermediate member 14 (module 117 of FIG. 6) and stack member 16 (module 115 of FIG. 6).

Having thus described the inventive method, reference to FIGS. 1-5 may be had for a further example. The first end portion 48 of the intermediate member 14 is seated within the second opening 22 of the base member 12 to dispose the intermediate member 14 at the predetermined angle relative to the longitudinal axis of the tubular portion 18 of the base member 12. The tapered end portion 64 of the top stack member 16 is then seated within the second end portion 50 of the intermediate member 14 to dispose the cylindrical extension 58 of the top stack member 16 at a second predetermined angle in relation to the longitudinal axis of the base member 12 so as to properly position the cylindrical extension 58 for the mounting of the hose member 60 thereon. Finally, the members 12, 14 and 16 are secured together by brazing, soldering or other means well known to the art. A thermostat assembly may be mounted on the webbing 24 prior to the soldering together of the members 12, 14 and 16. The base member 12 is then bolted onto the engine 42 by bolts 40 and nuts 46, and the hose 60 is mounted on the cylindrical extension 58. Finally, the cap member 66 can be mounted on the top stack member 16.

In operation, if a new model design requires that the radiator 62 be located in a position much higher than the position shown in FIG. 1, the height of the top stack member 16 may be increased by manufacturing a new stamping of only the top stack member 16 and not replacing the entire housing as would be required by prior art construction. A different situation would be that a new model design would result in a different spatial relationship between the engine 42 and the radiator 62, thus causing the angle between the top stack member 16 and the base member 12 to be different. To solve this problem, the base member 12 would be replaced with a base member having connecting ports to the intermediate member 14 which are angled so as to result in a housing adapted to the situation. Another problem exists when the radiator is located in a position requiring the cylindrical extension 14 to be rotated in relation to the remainder of the housing. This problem is solved by merely rotating the top stack member 16 to properly position the cylindrical extension 58 before brazing or soldering the top stack member 16 to the intermediate member 14. Thus, the subject thermostat housing 10 may be adapted to various engine and automobile designs by merely moving or rotating or extending parts before securing the parts together.

The instant invention has been described in an illustrative manner and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

I claim:

1. A modular thermostat housing construction for attachment to an engine comprising:
  (a) base module having means for attaching to said engine and defining a first chamber for conducting fluid;
  (b) thermostat receiving module having a wall defining a second chamber for conducting fluid and having an opening through said wall communicating with said second chamber; and
  (c) hollow extension module assembled on said wall of said thermostat receiving module to communicate with said opening;
  (d) said base module and said thermostat receiving module having interfitting means adapted for interfitting assembly and engageable to join said thermostat receiving module and said base module together in a selected one of a plurality of spatial configurations, whereby the spatial relationship of said extension module relative to said engine is determined.

2. The thermostat housing construction of claim 1 wherein said thermostat receiving module includes means within said second chamber for supporting said thermostat.

3. The thermostat housing construction of claim 1 wherein said thermostat receiving module includes stack module and intermediate coupling module assembled on said stack module and said base module.

4. The thermostat housing construction of claim 3 wherein said stack module includes means for supporting said thermostat.

5. The thermostat housing construction of claim 3 wherein said stack module defines a hollow interior having means for supporting said thermostat.

6. The thermostat housing construction of claim 1 wherein said base module includes means for attaching to said thermostat receiving module disposed in predetermined spatial relationship to said means for attaching to said engine.

7. The thermostat housing construction of claim 1 wherein said means for attaching to said engine is disposed at least partially in a first plane and said base module includes means for attaching to said thermostat receiving module disposed in a second plane, said first and second planes being disposed in predetermined spatial relationship to one another.

8. The thermostat housing construction of claim 1 wherein said thermostat receiving module includes means for attaching to said base module disposed in predetermined relationship to said means for attaching to said engine.

9. The thermostat housing construction of claim 1 wherein said thermostat receiving module has a longitudinal axis and said extension module is disposed along a predetermined radial of said longitudinal axis.

10. The thermostat housing construction of claim 1 further comprising flow directing module disposed on said base module for directing flow toward said thermostat.

11. The thermostat housing construction of claim 1 wherein said thermostat receiving module includes access opening and means for receiving a cap to seal said access opening.

12. A method of constructing a thermostat housing for an engine comprising:
(a) forming a thermostat receiving module to have a wall defining a first fluid conducting chamber communicating with a first opening;
(b) forming a second opening through said wall;
(c) attaching a hollow extension module to said wall to communicate with said second opening;
(d) forming a base module to have means for attaching to said engine and to define a second fluid conducting chamber communicating with a second opening;
(e) interfitting said base module with said thermostat receiving module so that said second opening is positioned at a preselected position relative to said base module; and
(f) attaching said base module to said thermostat receiving module.

13. The method of claim 12 wherein said base module is positioned on said thermostat receiving module so that said means for securing to said engine and said extension module are disposed in a first predetermined spatial relationship to one another.

14. A method of constructing a thermostat housing for an engine and radiator in predetermined spatial relationship to one another in accordance with claim 13, further comprising selecting said first predetermined spatial relationship in accordance with the predetermined spatial relationship of said engine and radiator.

15. The method of claim 12 further comprising forming said thermostat receiving module about a longitudinal axis.

16. The method of claim 15 further comprising disposing said extension module along a radial of said longitudinal axis.

17. The method of claim 12 further comprising forming said base module with means for engaging said thermostat receiving module.

18. The method of claim 17 wherein said means for engaging said thermostat receiving module and said means for securing to said engine are disposed in a second predetermined spatial relationship to one another.

19. A method of constructing a thermostat housing for an engine and radiator in predetermined spatial relationship with one another in accordance with claim 18 further comprising selecting said second predetermined spatial relationship in accordance with the predetermined spatial of said engine and radiator.

20. The method of claim 17 further comprising fabricating said means for securing to said engine to lie in a first plane and fabricating said means for engaging said thermostat receiving module to lie in a second plane of predetermined angular relationship to said first plane.

21. A method of constructing a thermostat housing for an engine and radiator in predetermined spatial relationship to one another in accordance with claim 20 further comprising selecting said predetermined angular relationship in accordance with the predetermined spatial relationship of said engine and radiator.

22. The method of claim 12 further comprising forming said thermostat receiving module with means for engaging said base module.

23. The method of claim 22 further comprising attaching said base module to said thermostat receiving module such that said means for engaging said base module and said means for securing to said engine are disposed in a second predetermined spatial relationship to one another.

24. A method of constructing a thermostat housing for an engine and radiator in predetermined spatial relationship to one another in accordance with claim 23 further comprising selecting said second predetermined spatial relationship in accordance with the predetermined spatial relationship of said engine and radiator.

25. The method of claim 12 further comprising forming said thermostat receiving module about a longitudinal axis with means for engaging said base module, said means for engaging said base module being formed to lie in a plane of predetermined angular relationship to said longitudinal axis.

26. A method of constructing a thermostat housing for an engine and radiator in predetermined spatial relationship to one another in accordance with claim 25 further comprising selecting said predetermined angular relationship in accordance with the spatial relationship of said engine and radiator.

27. A modular thermostat housing construction for system of engine and radiator in predetermined spatial relation comprising:
 (a) thermostat receiving module having a wall defining a first hollow interior and an opening through said wall communicating with said first interior;
 (b) hollow extension module for coupling to said radiator assembled on said wall to communicate with said opening; and
 (c) base module defining a second hollow interior for communication with said first interior and having means for attaching to said engine and being assembled with said thermostat receiving member such that said means for attaching to said engine and said extension module are disposed in a spatial relationship determined by said predetermined spatial relation of said engine and radiator.

28. A modular thermostat housing construction for attachment to an engine comprising:
 (a) base module having means for attaching to said engine and defining a first chamber for conducting fluid, said base module having a generally hemispherical portion and having a flattened portion located at a preselected position with respect to said hemispherical portion;
 (b) thermostat receiving module having a wall defining a second chamber for conducting fluid and having an opening through said wall communicating with said second chamber, said thermostat receiving module being assembled on said base module and disposed on said flattened portion;
 (c) hollow extension module assembled on said wall of said thermostat receiving module to communicate with said opening; and
 (d) wherein said preselected position of said flattened portion determines the spatial relationship of said thermostat receiving module relative to said engine.

* * * * *

UNITED STATES PATENT AND TRADEMARK OFFICE
CERTIFICATE OF CORRECTION

PATENT NO. : 4,509,465
DATED : April 9, 1985
INVENTOR(S) : Karl R. Edelmann

It is certified that error appears in the above-identified patent and that said Letters Patent is hereby corrected as shown below:

Column 2, line 62, after "of" insert -- a --.
Column 7, line 48, "modulel" should be -- module --.
Column 8, line 5, "across" should be -- access --.
Column 10, line 60, after "thermostat" insert --receiving module in any desired spatial relationship with respect to the --

Signed and Sealed this

Twenty-sixth Day of November 1985

[SEAL]

Attest:

DONALD J. QUIGG

Attesting Officer

Commissioner of Patents and Trademarks